(12) United States Patent
Obata et al.

(10) Patent No.: US 11,542,679 B2
(45) Date of Patent: Jan. 3, 2023

(54) SCRAPER VEHICLE, METHOD OF CONTROLLING THE SAME, AND TOWING VEHICLE

(71) Applicant: JDC Corporation, Minato-Ku Tokyo (JP)

(72) Inventors: Hiroshi Obata, Tokyo (JP); Hidetoshi Morimoto, Tokyo (JP); Yuu Sato, Tokyo (JP); Tsukasa Baba, Tokyo (JP); Takeo Asakura, Tokyo (JP); Masaaki Kusano, Tokyo (JP)

(73) Assignee: JDC Corporation, Tokyo (JP)

( * ) Notice: Subject to any disclaimer, the term of this patent is extended or adjusted under 35 U.S.C. 154(b) by 0 days.

(21) Appl. No.: 17/609,632

(22) PCT Filed: May 13, 2020

(86) PCT No.: PCT/JP2020/019097
§ 371 (c)(1),
(2) Date: Nov. 8, 2021

(87) PCT Pub. No.: WO2020/261788
PCT Pub. Date: Dec. 30, 2020

(65) Prior Publication Data
US 2022/0186464 A1 Jun. 16, 2022

(30) Foreign Application Priority Data
Jun. 26, 2019 (JP) .............................. JP2019-118141

(51) Int. Cl.
*E02F 3/84* (2006.01)
*E02F 3/76* (2006.01)

(52) U.S. Cl.
CPC ............ *E02F 3/844* (2013.01); *E02F 3/7668* (2013.01)

(58) Field of Classification Search
CPC .......... E02F 3/80; E02F 3/844; E02F 3/7668; B60K 17/04
See application file for complete search history.

(56) References Cited

U.S. PATENT DOCUMENTS 3,461,926 A * 8/1969 Larson ................. A01G 23/085
144/34.1
3,584,698 A * 6/1971 Larson ................... B60K 17/10
60/330
(Continued)

FOREIGN PATENT DOCUMENTS

JP        S48-14982 B1     5/1973
JP        S60-189434 U    12/1985
(Continued)

OTHER PUBLICATIONS

International Search Report in PCT/JP2020/019097, dated Jul. 28, 2020, and its English translation, 6 pgs.
(Continued)

*Primary Examiner* — Jessica H Lutz
(74) *Attorney, Agent, or Firm* — Young Basile Hanlon & MacFarlane, P.C.

(57) ABSTRACT

A scraper vehicle is described that can contribute, with a relatively simple and low-cost configuration, to shortening of a construction period, reduction of construction cost, and the like without travel being disabled easily. The scraper vehicle includes an auxiliary drive system that supplies, in excavation by the scraper, a driving force to at least part of traveling wheels of the scraper vehicle. The driving force is supplied constantly or in accordance with a travel resistance of the scraper vehicle.

18 Claims, 5 Drawing Sheets

(56) References Cited

U.S. PATENT DOCUMENTS

| | | | | |
|---|---|---|---|---|
| 3,918,546 | A | * | 11/1975 | Chichester .......... F16H 61/4078 180/243 |
| 4,071,106 | A | * | 1/1978 | Junck .................... F16H 61/456 180/69.6 |
| 5,682,958 | A | | 11/1997 | Kalhorn et al. |
| 8,051,916 | B2 | * | 11/2011 | Bright .................... E02F 3/655 180/242 |
| 8,061,466 | B2 | * | 11/2011 | Carlton ................. E02F 3/6481 180/242 |
| 8,459,394 | B2 | * | 6/2013 | Storer .................... E02F 3/6481 701/1 |
| 9,050,978 | B2 | * | 6/2015 | Keys, II ................. B60K 6/448 |
| 9,228,322 | B2 | * | 1/2016 | Keys, II ................. E02F 9/2079 |
| 9,290,912 | B2 | * | 3/2016 | Wen ........................ F15B 13/06 |
| 9,556,591 | B2 | * | 1/2017 | Shang .................... E02F 9/123 |
| 9,580,889 | B2 | * | 2/2017 | Kure ...................... E02F 9/2292 |
| 9,809,958 | B2 | * | 11/2017 | Shang ................... E02F 9/2228 |
| 9,951,497 | B2 | * | 4/2018 | Ge ......................... E02F 9/2075 |
| 2009/0025990 | A1 | * | 1/2009 | Futahashi ........... B66F 9/07572 180/65.245 |
| 2010/0018727 | A1 | | 1/2010 | Carlton et al. |
| 2015/0047331 | A1 | * | 2/2015 | Blum ...................... E02F 9/267 60/413 |
| 2015/0053435 | A1 | * | 2/2015 | Romig .................. E02F 9/2079 172/3 |
| 2017/0306589 | A1 | | 10/2017 | Ge et al. |
| 2017/0335867 | A1 | | 11/2017 | Meehan et al. |
| 2021/0254696 | A1 | * | 8/2021 | Wu ......................... F16H 47/04 |
| 2022/0118859 | A1 | * | 4/2022 | Worley .................... B60L 7/18 |

FOREIGN PATENT DOCUMENTS

| | | |
|---|---|---|
| JP | 2000-166305 A | 6/2000 |
| JP | 2008-007089 A | 1/2008 |
| JP | 2013-117098 A | 6/2013 |
| JP | 2017-536286 A | 12/2017 |
| WO | 2016/069485 A1 | 5/2016 |

OTHER PUBLICATIONS

Unknown, "Articulated Dump Truck Scrapers K-TEC 1243 ADT" and "K-TEC 1243 ADT" product brochure retrieved from <https://ktec.com/products/adt/1243adt/> on Nov. 7, 2021, with the product brochure having a copyright date of 2000-2001, and article entitled "K-Tec Reveals 1243 ADT Scraper" dated Apr. 22, 2014, retrieved from <https://www.constructionequipmentguide.com/k-tec-reveals-1243-adt-scraper/22602> on Nov. 7, 2021, 14 pgs.

\* cited by examiner

<PRESSURE ACCUMULATING OPERATION>

<PRESSURE SUPPLYING OPERATION>

<PRESSURE ACCUMULATING STATE>

<PRESSURE SUPPLYING STATE>

SCRAPER VEHICLE, METHOD OF CONTROLLING THE SAME, AND TOWING VEHICLE

TECHNICAL FIELD

The present invention relates to a scraper vehicle including a scraper capable of excavation, a method of controlling the scraper vehicle, and a towing vehicle that tows the scraper vehicle.

BACKGROUND

Conventionally, as an exemplary scraper vehicle including a scraper for scraping the surface of the earth or the like, a scraper vehicle manufactured by K-Tec Earthmovers Inc. (registered trademark) is known (see, for example, Internet <URL: http://ktec.com/our-scrapers/k-tec-1243-adt>).

Such a scraper vehicle is a towed vehicle that is provided with a scraper and towed by a towing vehicle such as a large truck or another towing vehicle, and is used for work of leveling off the surface of the earth or the like.

For example, in large construction work or the like (for example, development of a residential area, a golf course, or a solar-panel power plant site), work is repeatedly performed in which a scraper vehicle (towed vehicle) towed by a towing vehicle scrapes and levels off the protrusion of the surface of the earth with a scraper, collects the scraped earth and sand or the like in a storage portion, and conveys the stored earth and sand or the like to a predetermined earth-and-sand placing site to discharge it at the storage place.

Note that, although not such a towed vehicle, a configuration in which a small scraper is attached to a tractor and scraped soil is stored in a container and is conveyed is referred to as a ground leveling carrier or the like, and is described in, for example, JP Patent Publication No. 2000-166305 A.

BRIEF SUMMARY

Meanwhile, such a conventional scraper vehicle as described above is towed by a large towing vehicle and performs work. However, for example, due to a large scraping margin to the surface of the earth by the scraper, the scraper is caught into the surface of the earth, resulting in an increase in the resistance. In this case, only with the towing force of the towing vehicle (e.g., a large truck), it is difficult to continue the work (traveling, movement) due to idling of the tires (driving wheels) of the towing vehicle (e.g., the large truck) in some cases.

In such a case, for example, it is necessary to call a bulldozer or the like for support and to push the scraper vehicle towed by the towing vehicle from the rear of the towing vehicle to assist its travel (movement). However, in such a manner, there are issues such as an increase in construction cost, the construction period may become longer due to the poor work efficiency, and it is necessary to prepare and stand by a bulldozer in addition to the scraper vehicle.

The present invention has been made in view of such circumstances, and an object of the present invention is to provide a scraper vehicle that can contribute, even with a relatively simple and low-cost configuration, to shortening of a construction period, reduction of construction cost, and the like without travel being disabled easily. An object of the present invention also is to provide a method of controlling the scraper vehicle.

Furthermore, an object of the present invention is to provide a towing vehicle with preferable usability.

Therefore, a scraper vehicle according to the present invention may be a scraper vehicle including a scraper capable of excavation and an auxiliary drive system configured to supply, in excavation by the scraper, a driving force to at least part of traveling wheels of the scraper vehicle, constantly or in accordance with the travel resistance of the scraper vehicle.

A method of controlling the scraper vehicle according to the present invention may be a method of controlling a scraper vehicle including a scraper capable of excavation, the method including controlling, in excavation by the scraper, an auxiliary drive system to supply a driving force to at least part of traveling wheels of the scraper vehicle, constantly or in accordance with the travel resistance of the scraper vehicle.

A towing vehicle according to the present invention may be a towing vehicle configured to tow a scraper vehicle including a scraper capable of excavation, the towing vehicle including a detection device configured to detect information regarding travel of the towing vehicle and a communication device configured to communicate the information regarding the travel of the towing vehicle detected by the detection device to the scraper vehicle.

According to the present invention, provided can be a scraper vehicle that can contribute, even with a relatively simple and low-cost configuration, to shortening of a construction period, reduction of construction cost, and the like without travel being disabled easily, and a method of controlling the scraper vehicle.

Furthermore, according to the present invention, a towing vehicle with preferable usability can be achieved.

DETAILED DESCRIPTION

Hereinafter, an embodiment of the present invention will be described in detail with reference to the accompanying drawings. Note that the present invention is not limited to the embodiment described below.

A scraper vehicle 100 according to the present embodiment is used as a towed vehicle towed by a large truck or another towing vehicle 1.

Figure 1:
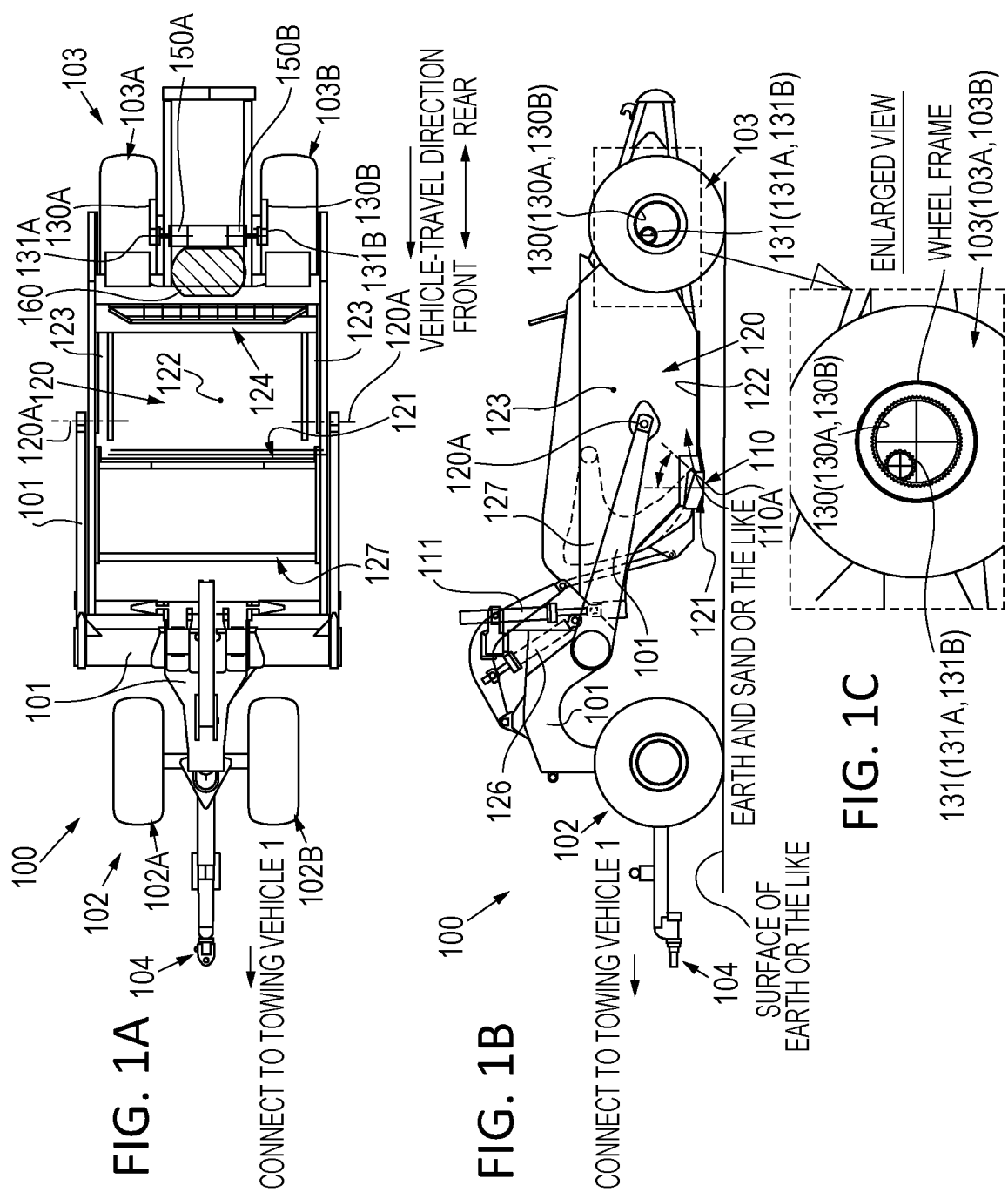
FIG. 1A is a plan view illustrating an exemplary overall configuration of a scraper vehicle according to an embodiment.
FIG. 1B is a side view of the scraper vehicle.
FIG. 1C is an enlarged view of a rear wheel portion of the scraper vehicle.
Figure 2:
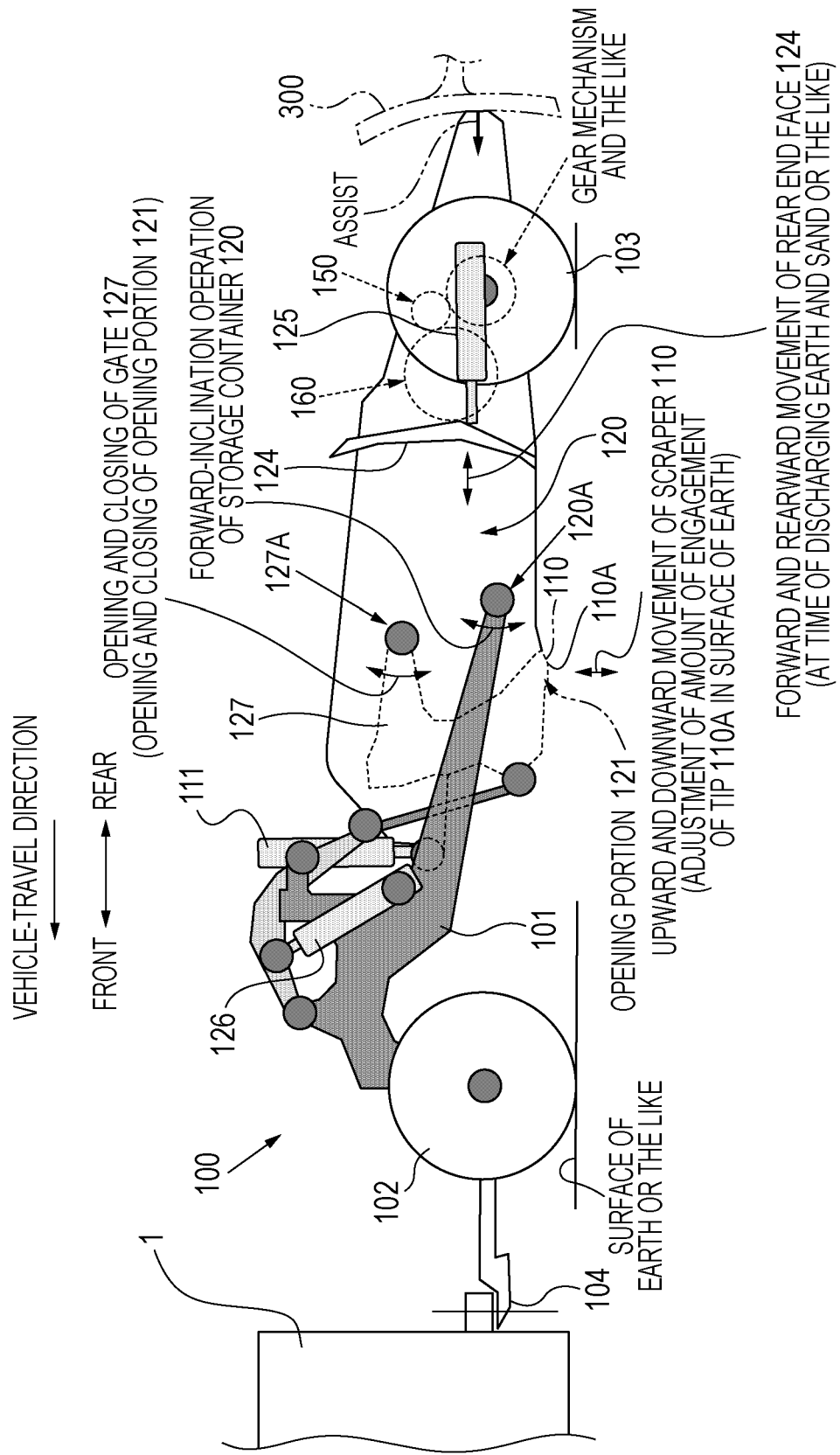
FIG. 2 is a side view schematically illustrating the scraper vehicle according to the embodiment.

As illustrated in FIGS. 1A, 1B, and 2, the scraper vehicle 100 includes a pair of left and right front wheels 102 (driven wheels) rotatably supported by a frame 101 through, for example, a suspension mechanism including a spring, a damper, and the like; and a pair of left and right rear wheels 103 (driven wheels). Note that the pair of left and right front wheels 102 (102A, 102B) can rotate in a mutually independent manner, and similarly, the pair of left and right rear wheels 103 (103A, 103B) can rotate in a mutually independent manner. Note that the pair of left and right front wheels 102 (102A, 102B) and the pair of left and right rear wheels 103 (103A, 103B) as the driven wheels correspond to exemplary traveling wheels according to the present embodiment.

Figure 5:
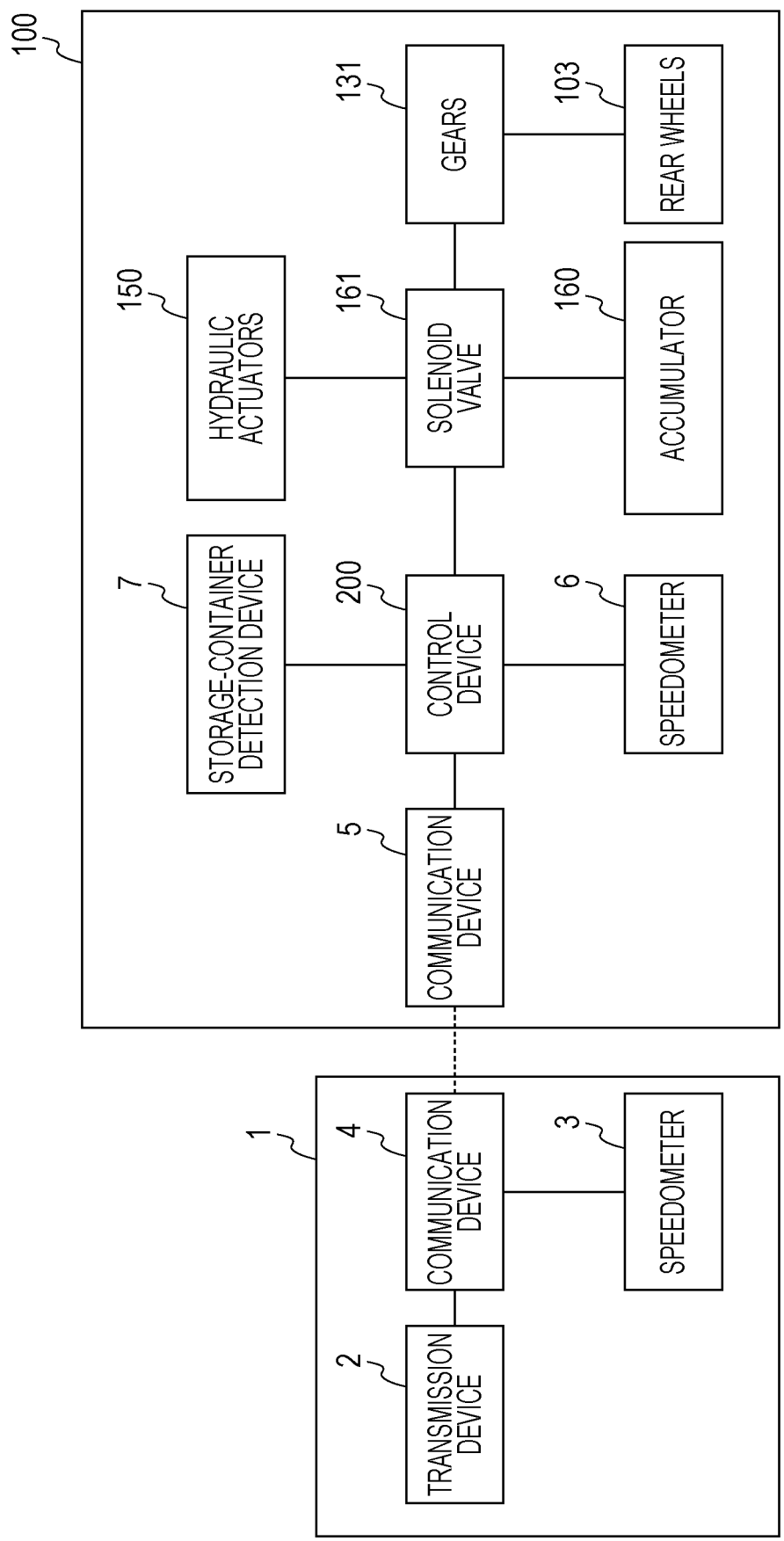
FIG. 5 is a block diagram of a towing vehicle and the scraper vehicle according to the embodiment.

As illustrated in FIG. 5, the scraper vehicle 100 further includes a communication device 5 communicable with a communication device 4 with which the towing vehicle 1 is provided, a speedometer 6 that detects the moving speed of the scraper vehicle 100, and a storage-container detection device 7 that detects how much a storage container 120 is storing an excavated object such as earth and sand.

As the communication device 4 and the communication device 5, various communication schemes can be used. In the present embodiment, proximity communication such as Bluetooth (registered trademark) or a FeliCa (registered trademark) module that is radio frequency identification (RFID) is used.

As the speedometer 6, one that detects the rotational speed of the rear wheels 103 can be used.

Note that the speedometer 6 is not necessarily provided. In such a case, a control device 200 may control a hydraulic actuator 150 with output of the speedometer 3 described below.

In the present embodiment, the storage-container detection device 7 detects whether the storage container 120 is full or almost full. The storage-container detection device 7 may detect whether the storage container 120 provided with a load cell is full or almost full from the weight of an excavated object, on the basis of output of the load cell. Further, the storage-container detection device 7 may detect whether the storage container 120 is full or almost full, on the basis of output of a non-contact rangefinder such as an ultrasonic rangefinder or a laser rangefinder provided above the storage container 120 or an image captured by a camera provided above the storage container 120. Note that the camera may be provided at a position where a scraper 110 to be described below can be captured.

A coupler 104 to be detachably coupled to a large truck or another towing vehicle 1 is provided in front of the frame 101 (to the left in FIGS. 1A and 1B).

The towing vehicle 1 includes a transmission device 2 (for example, an automatic transmission device) having a plurality of speed gears, a speedometer 3, and the communication device 4 that communicates with the communication device 5 of the scraper vehicle 100.

In a case where an automatic transmission device is used as the transmission device 2, switching between the speed gears is performed in response to the vehicle speed of the towing vehicle 1. In particular, when the vehicle speed reaches a predetermined vehicle speed set in advance or less due to application of a load during traveling, downshifting is executed automatically.

The speedometer 3 detects the speed of the towing vehicle 1 by detecting the rotational speed of the output shaft of the transmission device 2.

The communication device 4 communicates, to the communication device 5, the speed detected by the speedometer 3 and the fact that the downshifting is executed.

Note that in the present embodiment, the output of the towing vehicle 1 is 200 to 300 KW, preferably around 250 KW, but this is not limiting.

In addition, in the present embodiment, the towing vehicle 1 has a speed during excavation of 3 km/h to 5 km/h, preferably 3 km/h to 4 km/h, and a speed during non-excavation of 6 km/h to 8 km/h, but this is not limiting.

The scraper vehicle 100 includes the scraper 110 that performs excavation. The scraper 110 is a blade-shaped or spatula-shaped member for scraping earth and sand of a travel face such as the surface of the earth or the like. In the present embodiment, as illustrated in FIG. 1B, the scraper 110 is attached to the bottom of the storage container 120 that has an open upper face and stores earth and sand or the like, and extends along the vehicle-width direction (up-and-down direction in FIG. 1A) of the bottom of the storage container 120. Note that the travel face is not limited to the surface of the earth or the like, and thus any face is applicable if the scraper vehicle travels on the face (for example, artificial objects in addition to earth and sand, ice, and snow covering the surface of the earth).

The scraper 110 is integrated with the storage container 120. Thus, when a hydraulic cylinder 111 is shortened, the storage container 120 for earth and sand or the like is swung around a pivot 120A through the link mechanism and the storage container 120 inclines forward and downward (leftward and downward in FIGS. 1B and 2). As a result, a tip 110A of the scraper 110 can be moved toward the surface of the earth (downward in FIG. 1B), and the tip 110A can be engaged in the travel face such as the surface of the earth in a predetermined manner.

Note that not only the amount of engagement in the surface of the earth or the like but also the amount of excavation of earth and sand or the like (amount of excavation per amount of unit horizontal displacement) can be adjusted in accordance with the amount of downward protrusion of the tip 110A of the scraper 110 from the bottom of the storage container 120.

In addition, for example, at the time of movement without scraping the travel face such as the surface of the earth, the storage container 120 is swung around the pivot 120A through the link mechanism by extending the hydraulic cylinder 111. In this way, the tip 110A of the scraper 110 is spaced apart (retracted) from the travel face such as the surface of the earth.

The tip of the scraper 110 has a predetermined scooping angle A (see FIG. 1B) in a wedge shape (like a wedge) such that the scraper 110 can be engaged in the travel face such as the surface of the earth to scoop up the surface of the travel face in response to leftward travel (movement) of the scraper vehicle 100 in FIGS. 1B and 2.

Above the upper face (scooping face) of the scraper 110, an opening 121 is provided for introducing and storing earth and sand or the like scooped up by the tip of scraper 110 into the storage container 120, which storage container 120 is provided on the rear in the vehicle-travel direction of the scraper 110 (right in FIG. 1B).

The storage container 120 includes a bottom face 122, left and right side faces 123, and a rear end face 124, and can store, inside the storage container 120, the earth and sand or the like scooped up from the surface of the earth or the like by the scraper 110.

Further, the storage container 120 can discharge (release) the stored earth and sand or the like at a predetermined discharge place (or release place) even during traveling. Specifically, forward (leftward in FIGS. 1B and 2) extension of, for example, a hydraulic cylinder 125 (see FIG. 2) causes the rear end face 124 (rear end member) to move forward (toward the opening 121 side) relative to the storage container 120. As a result, the earth and sand or the like can be discharged from the opening 121 (namely, the gap between the bottom face 122 and the lower end of a swingable gate 127).

However, for example, a configuration can also be adopted in which the stored earth and sand or the like is discharged from the storage container 120 by another way such as obliquely lifting at least the bottom face 122.

Note that in the discharge (or release) of the earth and sand or the like during traveling, the hydraulic cylinder 111 is extended and the tip 110A of the scraper 110 is raised (retracted) from the travel face such as the surface of the earth to a predetermined height.

In addition, at the time of discharging the earth and sand or the like, in order to improve efficiency in the discharge, the mouth of the opening 121 can be enlarged by extending a hydraulic cylinder 126 and swinging the gate 127 upward through a pivot shaft 127A.

Here, for example, due to a large engagement margin (scraping margin) to the surface of the earth (the ground surface), the tip 110A of the scraper 110 is caught into the surface of the earth (the ground surface). As a result, only with the towing force of the towing vehicle 1 (e.g., a large truck), it is difficult in some cases to continue travel (movement) due to idling or the like of the tires (driving wheels) of the towing vehicle 1. In such a case, for example, it is necessary to call a bulldozer 300 (see FIG. 2) or the like for support and push the scraper vehicle 100 towed by the towing vehicle 1 from the rear of the scraper vehicle 100 to assist the travel (movement). However, in such a manner, there is an issue of an increase in construction cost, for example, the construction period may become longer due to the poor work efficiency and it is necessary to prepare and stand by the bulldozer 300.

Therefore, as illustrated in FIGS. 1A-1C and 2, the scraper vehicle 100 according to the present embodiment includes a hydraulic actuator (hydraulic motor) 150 capable of supplying a driving force with accumulated hydraulic pressure to at least either the pair of left and right front wheels 102 or the pair of left and right rear wheels 103.

In FIG. 1A, the rear wheels 103 are independently provided on the left and right, and the left and right wheels (103A, 103B) are provided one-to-one with such hydraulic actuators (hydraulic motors) 150 (150A, 150B), but this is not limiting.

Figure 4A:
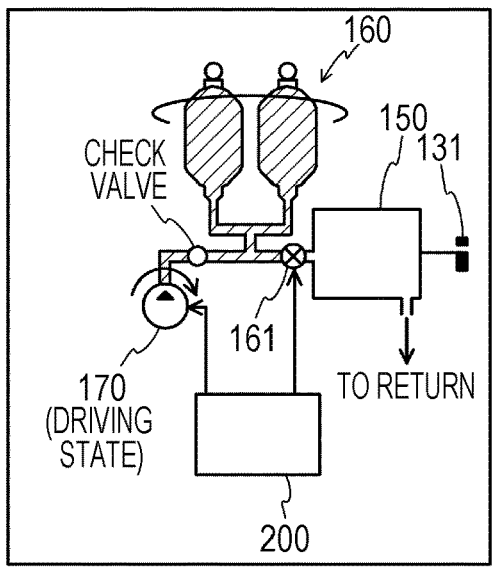
FIG. 4A illustrates an auxiliary drive system (at the time of pressure accumulating operation).
Figure 4B:
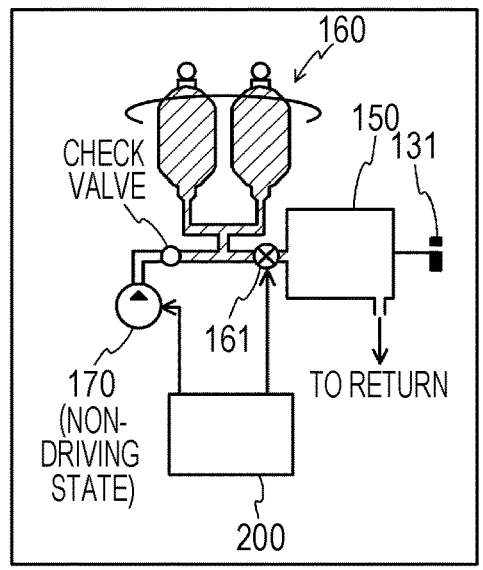
FIG. 4B illustrates the auxiliary drive system (at the time of pressure supplying operation).

The hydraulic actuators (hydraulic motors) 150 (150A, 150B) are connected to an accumulator (accumulation device) 160 that stores hydraulic oil boosted to predetermined hydraulic pressure. More specifically, as illustrated in FIGS. 4A and 4B, the hydraulic actuators 150 (150A, 150B) are connected to the accumulator 160 through a solenoid valve 161 and a hydraulic pump 170 is connected to the accumulator 160. The solenoid valve 161 and the hydraulic pump 170 are controlled by the control device 200. The respective output shafts (output rotary shafts) of the hydraulic actuators 150 (150A, 150B) are each provided with a gear 131 to be described below.

Figure 4C:
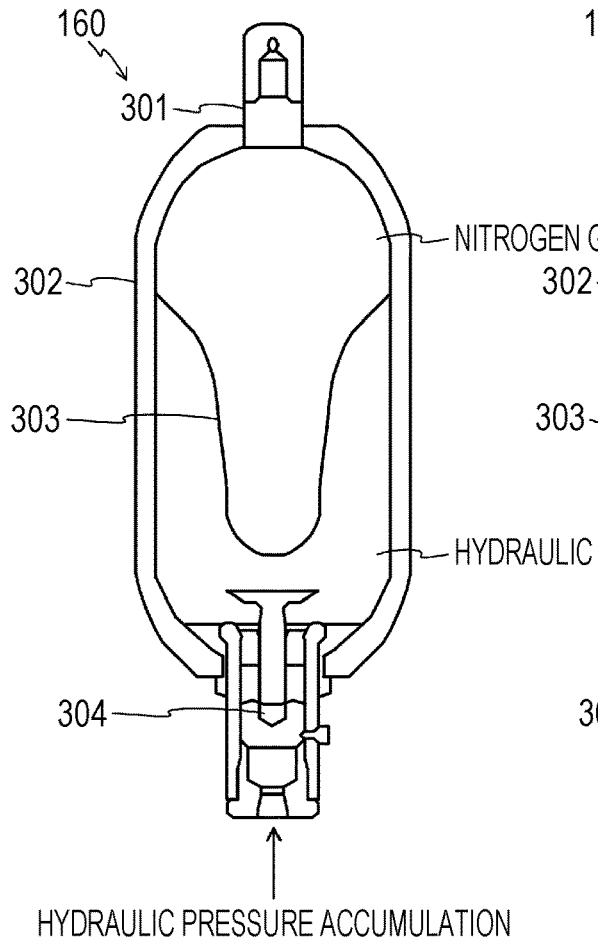
FIG. 4C illustrates an accumulator in a pressure accumulating state.
Figure 4D:
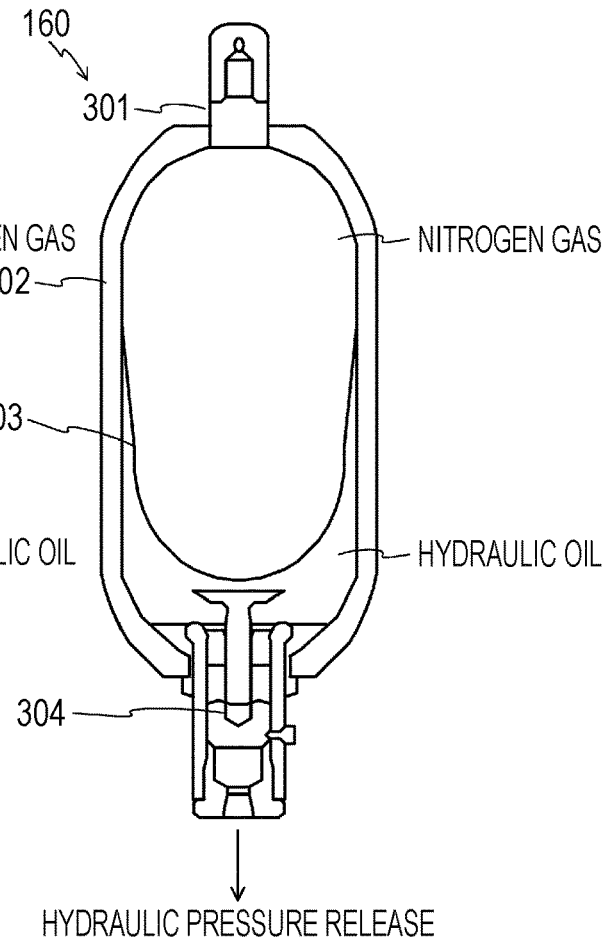
FIG. 4D illustrates the accumulator in a pressure supplying state.

Here, the accumulator 160 will be further described with reference to FIGS. 4C and 4D. As illustrated in FIGS. 4C and 4D, the accumulator 160 includes a main body 302, an air supply valve 301, a bladder 303, and a hydraulic-oil supply/discharge valve 304. The bladder 303 is a rubber film, nitrogen gas is filled in a space on the upper side of the bladder 303 of the main body 302, and hydraulic oil is present in a space on the lower side of the bladder 303 of the main body 302. The air supply valve 301 is a port for filling and sealing nitrogen gas, and the hydraulic-oil supply/discharge valve 304 is an access port for hydraulic oil.

In the present embodiment, the output of the hydraulic actuators (hydraulic motors) 150 is 40 KW to 200 KW (16% to 80% of the output of the towing vehicle 1), preferably 62.5 KW to 150 KW (25% to 60% of the output of the towing vehicle 1), and more preferably 100 KW to 125 KW (40% to 50% of the output of the towing vehicle 1). This is because the output of the hydraulic actuators (hydraulic motors) 150 does not need to be larger than that of the towing vehicle 1, so that the accumulator 160 and the hydraulic actuators 150 are large in size. In addition, this is because there is a possibility that idling of the tires is difficult to be improved if the output of the hydraulic actuators (hydraulic motors) 150 is less than 16% of the output of the towing vehicle 1.

In accordance with a command (control signal) (preprogrammed control-signal generation timing or control-signal generation timing by manual operation of the worker), the control device 200 causes pressure accumulation in the accumulator (accumulation device) 160 and supply of high-pressure hydraulic oil in the accumulator (accumulation device) 160 to the hydraulic actuators (hydraulic motors) 150 (150A, 150B). As a result, the hydraulic actuators (hydraulic motors) 150 (150A, 150B) rotation-drive.

For example, in order to cause pressure accumulation in the accumulator (accumulation device) 160, as illustrated in FIG. 4A, the control device 200 brings the hydraulic pump 170 into a driving state with the solenoid valve 161 remaining closed. As a result, fluid pressure (hydraulic pressure) output from the hydraulic pump 170 is accumulated in the accumulator (accumulation device) 160. FIG. 4C illustrates the accumulator 160 enlarged in the state of FIG. 4A.

For rotation-driving of the hydraulic actuators (hydraulic motors) 150 (150A, 150B), the control device 200 brings the hydraulic pump 170 into a non-driving state and opens the solenoid valve 161 as illustrated in FIG. 4B to supply high-pressure hydraulic oil in the accumulator (accumulation device) 160 to the hydraulic actuators (hydraulic motors) 150 (150A, 150B). As a result, the hydraulic actuators (hydraulic motors) 150 (150A, 150B) rotation-drive. FIG. 4D illustrates the accumulator 160 enlarged in the state of FIG. 4B.

The rotational force of the hydraulic actuators (hydraulic motors) 150 (150A, 150B) is transmitted to the rear wheels 103 (103A, 103B) through a gear mechanism such as a speed reducer (e.g., the gear 131 in FIG. 4B). As a result, the rear wheels 103 (103A, 103B) drive.

As described above, according to the present embodiment, the hydraulic actuators (hydraulic motors) 150 (150A, 150B) rotation-drive with the hydraulic pressure (fluid pressure, fluid pressure energy) accumulated in the accumulator (accumulation device) 160, allowing the rear wheels 103 (103A, 103B) connected to the hydraulic actuators (hydraulic motors) 150 (150A, 150B) to rotation-drive. For example, due to a large scraping margin to the surface of the earth (the ground surface), the tip 110A of the scraper 110 may be caught into the surface of the earth (the ground surface). In this case, only with the towing force of the towing vehicle 1 (e.g., a large truck), it may be difficult to continue travel (movement) due to idling or the like of the tires. Therefore, as in the present embodiment, conventionally, even in a case where the continuation of travel is difficult without assistance by a bulldozer or the like (even in a case where travel is already disabled), the rotation-driving of the rear wheels 103 (103A, 103B) due to the hydraulic actuators (hydraulic motors) 150 (150A, 150B) enables the scraper vehicle 100 to contribute to, for example, shortening of a construction period, reduction of construction cost, and the like without the travel being disabled.

Namely, according to the present embodiment, a scraper vehicle can be provided that can contribute to shortening of a construction period, reduction of construction cost, and the like without the travel being disabled easily even if the scraper vehicle serves as a towed vehicle that has a relatively simple and low-cost configuration and is towed by a large truck or another towing vehicle. A method of controlling the scraper vehicle can also be provided.

Here, as each hydraulic motor 150 according to the present embodiment, a typical hydraulic motor can be adopted. A hydraulic motor is a type of hydraulic motor that supplies, from the primary side, pressure oil obtained by moving a hydraulic pump and discharges the pressure oil from the secondary side to extract the rotary motion of the shaft. In addition, exchanging the primary side and the secondary side enables reverse rotation (assist in a direction in which the vehicle moves rearward). The torque can be controlled by controlling the pressure of the oil to be supplied, and output (rotational speed of the shaft) can be controlled by controlling the flow rate of the oil to be supplied.

Note that pressure accumulation into the accumulator (accumulation device) 160 can be performed, for example, as follows.

Figure 3:
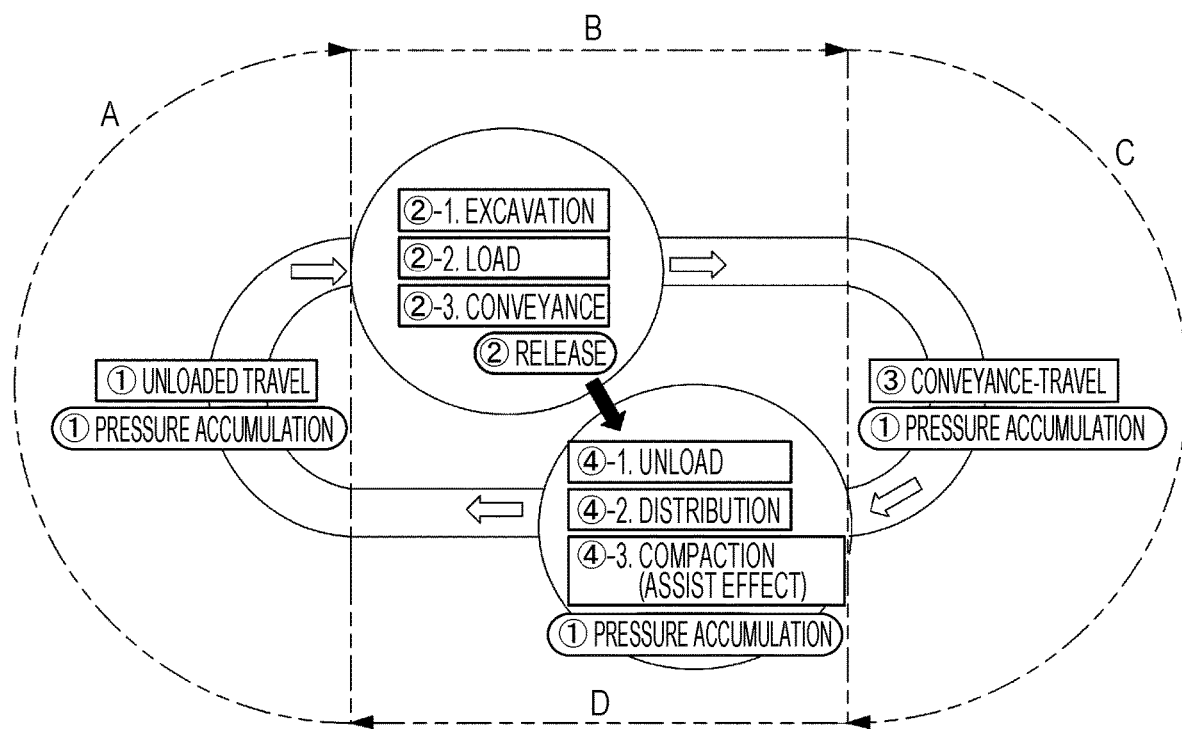
FIG. 3 explanatorily illustrates a cycle of scraping work with the scraper vehicle according to the embodiment.

In the present embodiment, the scraper vehicle 100 is towed by a large truck or another towing vehicle 1 and moved following such a work cycle (scraping work cycle) as illustrated in FIG. 3.

Section (Area) A in FIG. 3

The section (area) A in FIG. 3 is an unloaded travel section (area) in which the scraper vehicle 100 towed by the towing vehicle 1 travels in an unloaded state and a state in which the tip 110A of the scraper 110 is lifted and the ground surface is not scraped (retracted state of the scraper 110). In the section (area) A, fluid pressure such as hydraulic pressure is accumulated in the accumulator (accumulation device) 160 through, for example, the hydraulic pump 170 (see FIG. 4A). Note that as the accumulator (accumulation device) 160 and the hydraulic pump 170, typical ones that are conventionally known can be adopted.

In this case, the hydraulic pump 170 is equipped with the scraper vehicle 100 and is rotation-connected to the rear wheels 103 (103A, 103B). As a result, the hydraulic pump 170 can drive due to the rotation of the rear wheels 103 (103A, 103B) of the scraper vehicle 100 that is towed by the towing vehicle 1 and travels. In the present embodiment, control of a hydraulic circuit (or control of a clutch mechanism or the like provided between the hydraulic pump 170 and the rear wheels 103 (103A, 103B)) by the control device 200 enables switching between the driving state and the non-driving state of the hydraulic pump 170.

Note that, also in the section (area) A, the control device 200 may assist, with the hydraulic actuators (hydraulic motors) 150, the travel of the scraper vehicle in a case where the speed of the towing vehicle 1 or the scraper vehicle 100 falls, for example, below 4.5 Km/h, or in a case where the transmission device 2 performs downshifting, on the basis of output of at least either the speedometer 3 or the speedometer 6. This arrangement enables shortening of the entire work cycle.

In the present embodiment, the hydraulic pump 170, the accumulator (accumulation device) 160, the hydraulic motors 150, the control device 200, and the others correspond to an exemplary auxiliary drive system.

Section (Area) B in FIG. 3

The section B following the section A in FIG. 3 is a scraping work section (area) in which the scraper vehicle 100 that is towed and travels while scraping and leveling off the travel face such as the surface of the earth by engaging the tip 110A of the scraper 110 in the ground surface. This section is also a sand-and-earth load and sand-and-earth conveyance section (area) because the scraper vehicle 100 travels with the scraped soil stored in the storage container 120.

In this section, with the hydraulic pump 170 in the non-driving state, the control device 200 opens the solenoid valve 161 to supply fluid pressure accumulated in the accumulator (accumulation device) 160 during traveling in the unloaded travel section (section A) or the like to the hydraulic actuators (hydraulic motors) 150 (150A, 150B), resulting in rotation-driving (drive-assist) of the rear wheels 103 (103A, 103B) (see FIG. 4B). In such a manner, the control device 200 assists (drive-assists) the travel of the scraper vehicle 100.

The control device 200 is required to assist, with the hydraulic actuators (hydraulic motors) 150, the travel of the scraper vehicle, in a case where the speed of the towing vehicle 1 or the scraper vehicle 100 falls, for example, below 2.5 to 3 Km/h, or in a case where the transmission device 2 performs downshifting, on the basis of output of at least either the speedometer 3 or the speedometer 6.

With this arrangement, conventionally, even in a case where the continuation of travel is difficult without assistance by a bulldozer or the like (even in a case where travel is already disabled) due to an increase in the travel resistance such as a case where a scraping margin to a travel face such as the surface of the earth (the ground surface) is relatively larger, the scraper vehicle can make a major contribution to shortening of a construction period, reduction of construction cost, and the like without the travel being disabled.

Note that the travel-assist is not limited to the case where, for example, by programming to the control device 200, the control device 200 controls the hydraulic circuit (such as the solenoid valve 161 of the hydraulic circuit connecting the accumulator 160 and hydraulic actuators 150) to assist constantly the travel in the section B, and thus the control device 200 may assist the travel when the scraper vehicle 100 becomes a state that hinders the continuation of travel due to an increase in the travel resistance larger than a predetermined value in the section B. For example, the control device 200 can also control the hydraulic circuit on the basis of the load detection result of a load cell or the like attached to the coupler 104 or the frame 101 in the vicinity thereof (or by manual operation of the driver of the towing vehicle 1).

Note that also in the section (area) B, the control device 200 may bring the hydraulic pump 170 into the non-driving state in a case where the storage-container detection device 7 detects that the storage container 120 is full or almost full. Similarly, also in the section (area) B, the control device 200 is required to stop assisting the travel of the scraper vehicle due to the hydraulic actuators (hydraulic motors) 150, in a case where the speed of the towing vehicle 1 or the scraper vehicle 100 reaches, for example, 3 Km/h or more, or in a case where the transmission device 2 performs upshifting, on the basis of output of at least either the speedometer 3 or the speedometer 6. This arrangement enables efficient use of the accumulator 160 and the hydraulic actuators 150.

Section (Area) C in FIG. 3

Subsequently, the section C in FIG. 3 is a section (area) in which the scraper vehicle 100 conveyance-travels for conveying a load such as the earth and sand scraped in the section B and stored in the storage container 120 to an unload place (earth-and-sand accumulation place). In this section, fluid pressure such as hydraulic pressure is accumulated in the accumulator (accumulation device) 160 through, for example, the hydraulic pump 170 (see FIG. 4A). In addition, the scraper vehicle 100 is traveling in the state in which the tip 110A of the scraper 110 is lifted and the ground surface is not scraped (retracted state of the scraper 110).

Section (Area) D in FIG. 3

The section D following the section C in FIG. 3 is a section (area) in which the scraper vehicle 100 unloads the load such as the earth and sand conveyed from the section C and distributes (spreads) the unloaded earth and sand. In this section, fluid pressure such as hydraulic pressure is accumulated in the accumulator (accumulation device) 160 through, for example, the hydraulic pump 170 (see FIG. 4A). In addition, the scraper vehicle 100 is traveling in the state in which the tip 110A of the scraper 110 is lifted and the ground surface is not scraped (retracted state of the scraper 110).

Note that, also in the section C and the section D, the control device 200 is required to assist the travel of the scraper vehicle due to the hydraulic actuators (hydraulic motors) 150, in a case where the speed of the towing vehicle 1 or the scraper vehicle 100 falls, for example, below 2.5 to 3 Km/h or in a case where the transmission device 2 performs downshifting, on the basis of output of at least either the speedometer 3 or the speedometer 6. This arrangement enables shortening of the entire work cycle.

Note that, in the present embodiment, a situation in which the scraper vehicle 100 is disabled to travel and is pushed from the rear of the scraper vehicle 100 by a bulldozer or the like hardly occurs. Thus, the rear of the scraper vehicle 100 can be provided with a compaction roller or the like. In this case, for example, the earth and sand or the like distributed (spread) in the section D can be compacted by the compaction roller or the like disposed on the rear of the scraper vehicle 100.

As described above, in the present embodiment, in a section in which no scraping work is performed by the scraper 110 (section in which a load to the towing vehicle 1 is relatively smaller; section in which the scraper 110 is retracted) (sections A, C, and D in FIG. 3), fluid pressure such as hydraulic pressure is accumulated in the accumulator (accumulation device) 160 through, for example, the hydraulic pump 170. Then, in a scraping work section in which scraping work is performed (section in which a load to the towing vehicle 1 is larger; section in which the scraper 110 is engaged in the travel face) (section B in FIG. 3), rotation-driving (drive-assist) of the rear wheels 103 (103A, 103B) due to supply of the accumulated fluid pressure to the hydraulic actuators (hydraulic motors) 150 (150A, 150B) assists the travel of the scraper vehicle 100. With this arrangement, conventionally, even in a case where the continuation of travel is difficult without assist by a bulldozer or the like (even in a case where travel is already disabled), the scraper vehicle can contribute to shortening of a construction period, reduction of construction cost, and the like without the travel being disabled. Further, the scraper vehicle 100 can have a simple and economical configuration that does not need to independently include a driving source (an internal combustion engine, an electric motor, or the like), and a preferably usable configuration that does not need to refuel (fuel supply), charge an electric motor or the like.

Note that by, for example, programming to the control device 200, the control device can control the hydraulic circuit such that fluid pressure such as hydraulic pressure is accumulated in the accumulator (accumulation device) 160 through, for example, the hydraulic pump 170 in the sections A, C, and D in FIG. 3. In addition, the driver of the towing vehicle 1 can control the hydraulic circuit by manual operation.

Furthermore, in the present embodiment, as illustrated in FIGS. 1A to 1C, the gear mechanism interposed between the hydraulic actuators (hydraulic motors) 150 (150A, 150B) and the rear wheels 103 (103A, 103B) can include, for example, internal gears 130 (130A, 130B) and such gears 131 (131A, 131B) as described above. The internal gears 130 (130A, 130B) rotate coaxially and integrally with the rear wheels 103 (103A, 103B), and each include a gear (internal gear) on the inner peripheral side. The gears 131 (131A, 131B) are meshed with the internal gears of the internal gears 130 (130A, 130B) and rotate coaxially and integrally with the output shafts (output rotary shafts) of the hydraulic motors 150 (150A, 150B).

Note that each internal gear 130 (130A, 130B) can be substantially integrally attached to the corresponding wheel frame (annular element to which a tire is assembled on the outer periphery) that rotatably supports the corresponding rear wheel 103 (103A, 103B) around the axle.

In this case, the gears 131 (131A, 131B) are rotatably supported on the scraper 110 side (the frame side of the scraper 110) through the hydraulic actuators (hydraulic motors) 150 (150A, 150B).

According to such a configuration, a predetermined relatively large reduction gear ratio can be achieved relatively easily and at low cost. In addition, such internal gears as described above are provided, so that breakage or the like due to, for example, engagement of foreign matter can be suppressed effectively. In the present embodiment, the fluid pressure accumulated in the accumulator (accumulation device) 160 is supplied to the hydraulic actuators (hydraulic motors) 150 (150A, 150B) at predetermined timing (for example, in a scraping work section in which scraping work is performed (in a section in which a load to the towing vehicle 1 is larger) (section B in FIG. 3)). This arrangement enables rotation-driving of the rear wheels 103 (103A, 103B) through the gears 131 (131A, 131B) integrally attached to the output rotary shafts of the hydraulic actuators (hydraulic motors) 150 (150A, 150B) and the internal gears 130 (130A, 130B) meshed with the gears 131 (131A, 131B).

Note that, in the above description, the hydraulic cylinders 111, 125, 126, and the like, can use hydraulic pressure supplied from the towing vehicle 1 side and can also use, for example, the fluid pressure accumulated in the accumulator (accumulation device) 160.

In the present embodiment, the fluid pressure accumulated in the accumulator (accumulation device) 160 is not limited to the hydraulic pressure. Thus, fluid pressure of another fluid can also be used. Namely, the hydraulic pump is an exemplary fluid pressure pump, and each hydraulic motor is an exemplary fluid pressure motor.

Furthermore, in the present embodiment, the case where the auxiliary drive system that includes the accumulator 160, the hydraulic pump 170, and the hydraulic motors 150 and uses hydraulic energy (fluid pressure energy) is adopted as an auxiliary drive system has been described as an example, but this is not limiting. For example, the auxiliary drive system may be an auxiliary drive system that includes a rechargeable storage battery (corresponding to the accumulator 160 in FIGS. 4A, 4B), a generator (corresponding to the hydraulic pump 170 in FIGS. 4A, 4B), and an electric motor (corresponding to each hydraulic motor 150 in FIGS. 4A, 4B) and uses electric energy.

Note that a hydraulic pump and a hydraulic motor can be of a type capable of achieving both functions by switching a hydraulic circuit or the like. A generator and an electric motor can be an electric generator in which the generator and the electric motor are integrated.

In addition, the auxiliary drive system according to the present invention can include at least either an auxiliary drive system that uses fluid pressure energy as a driving force or an auxiliary drive system that uses electric energy as a driving force. Namely, the auxiliary drive system can include both the auxiliary drive systems in addition to any one of the auxiliary drive systems.

As described above, according to the present embodiment, a scraper vehicle can be provided that can contribute to shortening of a construction period, reduction of construction cost, and the like without the travel being disabled easily even if the scraper vehicle serves as a towed vehicle that has a relatively simple and low-cost configuration and is towed by a large truck or another towing vehicle. A method of controlling the scraper vehicle can also be provided.

In addition, as illustrated in FIG. 3, the present embodiment is focused on that a cycle of scraping work with the scraper vehicle includes a section (sections A, C, and D in FIG. 3) in which a load to the towing vehicle 1 is relatively smaller, such as earth-and-sand conveyance, a release section, and an unload section; and a scraping work section (section in which a load to the towing vehicle 1 is larger) (section B in FIG. 3) in which actual scraping work (work of saving and collecting earth and sand or the like of the surface of the earth or the like) is performed. In addition, energy is accumulated in the accumulator in the section (sections A, C, and D in FIG. 3) in which the load to the towing vehicle 1 is relatively smaller, and the accumulated energy is used as auxiliary drive (drive-assist) in the scraping work section (section B in FIG. 3). This arrangement enables such accumulated energy to be used as auxiliary drive (drive-assist) very efficiently without changing a typical scraping work cycle that is performed conventionally.

Furthermore, in the present embodiment, the case where the pair of left and right front wheels 102 (102A, 102B) and the pair of left and right rear wheels 103 (103A, 103B) are provided has been described, but this is not limiting. For example, there is a case where no front wheels 102 (102A, 102B) are provided and a case where traveling wheels (for example, intermediate wheels or traveling wheels attached to any of the third axle to the last axle) different from the front wheels 102 and the rear wheels 103 are provided. In such cases, the auxiliary drive system is required to supplementary supply drive to at least part of those wheels.

As described above, if the communication device 4 of the towing vehicle 1 communicates the speed detected by the speedometer 3 and the shift state of the transmission device to the communication device 5 of the scraper vehicle 100, the towing vehicle 1 with preferable usability can be achieved.

Note that, in the above-described embodiment, the scraper vehicle 100 is towed by the towing vehicle 1; however, a self-propelled scraper vehicle can also be used as the scraper vehicle 100.

The embodiment described above is a merely example for describing the present invention, and thus various changes may be made without departing from the gist of the present invention.

The following is a list of reference numbers used in the specification and drawings.
1 towing vehicle
100 scraper vehicle
102 (102A, 102B) pair of right and left front wheels
103 (103A, 103B) pair of left and right rear wheels
110 scraper
110A tip of scraper
120 storage container
150 (150A, 150B) hydraulic actuators (hydraulic motors)
160 accumulator (accumulation device)
161 solenoid valve (opening/closing valve)
170 hydraulic pump
200 control device

The invention claimed is:

1. A scraper vehicle comprising:
a scraper capable of excavation; and
an auxiliary drive system configured to supply, in excavation by the scraper, a driving force to at least part of traveling wheels of the scraper vehicle, constantly or in accordance with a travel resistance of the scraper vehicle,
wherein the auxiliary drive system accumulates energy in response to retraction of the scraper, and supplies, in accordance with the travel resistance of the scraper vehicle even during accumulation of the energy, the driving force to the at least part of the traveling wheels of the scraper vehicle.

2. The scraper vehicle according to claim 1, wherein the auxiliary drive system supplies the driving force to the at least part of the traveling wheels of the scraper vehicle, based on information regarding travel of at least either a towing vehicle that tows the scraper vehicle or the scraper vehicle.

3. The scraper vehicle according to claim 1, wherein the auxiliary drive system stops the supply of the driving force to the at least part of the traveling wheels of the scraper vehicle, based on information regarding travel of at least either a towing vehicle that tows the scraper vehicle or the scraper vehicle.

4. The scraper vehicle according to claim 1, wherein the auxiliary drive system stops the supply of the driving force to the at least part of the traveling wheels of the scraper vehicle, based on an amount of the excavation by the scraper.

5. The scraper vehicle according to claim 1, wherein
the scraper vehicle serves as a towed scraper vehicle to be towed by a towing vehicle, and
the towed scraper vehicle is provided with a detection device that detects the travel resistance.

6. The scraper vehicle according to claim 1, wherein
the scraper vehicle serves as a towed scraper vehicle to be towed by a towing vehicle, and
the towing vehicle is provided with a detection device that detects the travel resistance.

7. The scraper vehicle according to claim 5, wherein the auxiliary drive system stops the supply of the driving force to the at least part of the traveling wheels of the scraper vehicle, based on an amount of the excavation by the scraper.

8. The scraper vehicle according to claim 6, wherein the auxiliary drive system stops the supply of the driving force to the at least part of the traveling wheels of the scraper vehicle, based on an amount of the excavation by the scraper.

9. The scraper vehicle according to claim 2, wherein the auxiliary drive system stops the supply of the driving force to the at least part of the traveling wheels of the scraper vehicle, based on an amount of the excavation by the scraper.

10. The scraper vehicle according to claim 1, wherein the auxiliary drive system is controlled based on travel information from a towing vehicle through proximity communication.

11. The scraper vehicle according to claim 1, wherein the auxiliary drive system accumulates pressure or recharges in response to the retraction of the scraper.

12. The scraper vehicle according to claim 11, wherein
the scraper vehicle serves as a towed scraper vehicle to be towed by a towing vehicle, and
the towed scraper vehicle is provided with a detection device that detects the travel resistance.

13. The scraper vehicle according to claim 11, wherein
the scraper vehicle serves as a towed scraper vehicle to be towed by a towing vehicle, and
the towing vehicle is provided with a detection device that detects the travel resistance.

14. The scraper vehicle according to claim 11, wherein the auxiliary drive system supplies the driving force to the at least part of the traveling wheels of the scraper vehicle, based on information regarding travel of at least either a towing vehicle that tows the scraper vehicle or the scraper vehicle.

15. The scraper vehicle according to claim 11, wherein the auxiliary drive system stops the supply of the driving force to the at least part of the traveling wheels of the scraper vehicle, based on information regarding travel of at least either a towing vehicle that tows the scraper vehicle or the scraper vehicle.

16. The scraper vehicle according to claim 11, wherein the auxiliary drive system stops the supply of the driving force to the at least part of the traveling wheels of the scraper vehicle, based on an amount of the excavation by the scraper.

17. The scraper vehicle according to claim 11, wherein the auxiliary drive system is controlled based on travel information from a towing vehicle through proximity communication.

18. A method of controlling a scraper vehicle including a scraper capable of excavation, the method comprising:
controlling an auxiliary drive system to supply, in excavation by the scraper, a driving force to at least part of traveling wheels of the scraper vehicle, constantly or in accordance with a travel resistance of the scraper vehicle, to accumulate energy in response to retraction of the scraper, and to supply, in accordance with the travel resistance of the scraper vehicle even during accumulation of the energy, the driving force to the at least part of the traveling wheels of the scraper vehicle.

* * * * *